(12) United States Patent
Takahata

(10) Patent No.: US 10,135,096 B2
(45) Date of Patent: Nov. 20, 2018

(54) NONAQUEOUS ELECTROLYTE SECONDARY BATTERY AND METHOD FOR PRODUCING SAME

(71) Applicant: TOYOTA JIDOSHA KABUSHIKI KAISHA, Toyota-shi, Aichi-ken (JP)

(72) Inventor: Koji Takahata, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 233 days.

(21) Appl. No.: 15/027,033

(22) PCT Filed: Oct. 1, 2014

(86) PCT No.: PCT/IB2014/001970
§ 371 (c)(1),
(2) Date: Apr. 4, 2016

(87) PCT Pub. No.: WO2015/049571
PCT Pub. Date: Apr. 9, 2015

(65) Prior Publication Data
US 2016/0233550 A1 Aug. 11, 2016

(30) Foreign Application Priority Data
Oct. 4, 2013 (JP) .................................. 2013-209316

(51) Int. Cl.
| | |
|---|---|
| *H01M 10/0569* | (2010.01) |
| *H01M 10/0587* | (2010.01) |
| *H01M 10/0525* | (2010.01) |
| *H01M 10/052* | (2010.01) |

(52) U.S. Cl.
CPC ..... *H01M 10/0569* (2013.01); *H01M 10/052* (2013.01); *H01M 10/0525* (2013.01); *H01M 10/0587* (2013.01); *H01M 2220/20* (2013.01); *H01M 2300/004* (2013.01); *Y02T 10/7011* (2013.01)

(58) Field of Classification Search
CPC ......... H01M 10/0567; H01M 10/0587; H01M 10/0525; H01M 4/366; H01M 4/485
See application file for complete search history.

(56) References Cited

U.S. PATENT DOCUMENTS

| | | | | |
|---|---|---|---|---|
| 2004/0170898 | A1* | 9/2004 | Shibuya | H01M 2/0212 |
| | | | | 429/231.8 |
| 2005/0079419 | A1* | 4/2005 | Jan | H01M 4/366 |
| | | | | 429/231.95 |
| 2008/0318131 | A1* | 12/2008 | Watanabe | C01G 51/42 |
| | | | | 429/231.95 |

FOREIGN PATENT DOCUMENTS

| | | |
|---|---|---|
| JP | 2010-113920 A | 5/2010 |
| WO | 2010/052542 A1 | 5/2010 |

\* cited by examiner

*Primary Examiner* — Kenneth J Douyette
(74) *Attorney, Agent, or Firm* — Sughrue Mion, PLLC

(57) ABSTRACT

A nonaqueous electrolyte secondary battery is provided with a wound electrode assembly (40), a battery case (20) housing the wound electrode assembly (40), and a nonaqueous electrolyte solution (80) contained in the battery case (20). The nonaqueous electrolyte solution (80) includes an internal electrolyte solution and an external electrolyte solution. The internal electrolyte solution is contained in the interior of the wound electrode assembly (40). The external electrolyte solution (80*a*) is collected at the bottom of the battery case (20). The viscosity of the internal electrolyte solution is greater than the viscosity of the external electrolyte solution (80*a*).

6 Claims, 6 Drawing Sheets

NONAQUEOUS ELECTROLYTE SECONDARY BATTERY AND METHOD FOR PRODUCING SAME

BACKGROUND OF THE INVENTION

1. Field of the Invention

The invention relates to a nonaqueous electrolyte secondary battery and to a method for producing the battery. In this Specification, a "secondary battery" refers to a conventional battery that can be repeatedly charged. A "nonaqueous electrolyte secondary battery" refers to a secondary battery that uses a nonaqueous electrolyte that contains a nonaqueous solvent in which an electrolyte salt is dissolved. A "lithium ion secondary battery", which is a type of "nonaqueous electrolyte secondary battery", refers to a secondary battery that uses the lithium ion as an electrolyte ion and that implements charge/discharge by the movement of charge associated with the lithium ion between the positive and negative electrodes. The lithium ion secondary battery in this Specification can encompass the batteries generally referred to as "lithium secondary batteries" (for example, lithium ion polymer secondary batteries).

2. Description of Related Art

Here, for example, Japanese Patent Application Publication No. 2010-113920 (JP 2010-113920 A) discloses a lithium ion secondary battery provided by the introduction into a battery case of an electrolyte solution having a higher lithium ion concentration than the electrolyte solution disposed between the positive electrode active material layer and the negative electrode active material layer. This lithium ion secondary battery makes it possible—even when high-rate charge/discharge is carried out—to suppress reductions in the lithium ion concentration of the electrolyte solution disposed between the positive electrode active material layer and the negative electrode active material layer and to thereby suppress increases in the battery resistance.

SUMMARY OF THE INVENTION

The inventor proposes a novel construction by which the resistance increase in a battery during high-rate charge/discharge can be kept low.

A first aspect of the invention relates to a nonaqueous electrolyte secondary battery. This nonaqueous electrolyte secondary battery contains a wound electrode assembly, a battery case, and a nonaqueous electrolyte solution. The battery case houses the wound electrode assembly. The nonaqueous electrolyte solution is housed in the battery case. The nonaqueous electrolyte solution contains an internal electrolyte solution and an external electrolyte solution. The internal electrolyte solution is contained in the interior of the wound electrode assembly. The external electrolyte solution is collected at the bottom of the battery case. The viscosity of the internal electrolyte solution is greater than the viscosity of the external electrolyte solution. This nonaqueous electrolyte secondary battery can maintain its battery characteristics at high levels in repetitive high-rate charge/discharge applications.

The difference worked out by subtracting the viscosity of the external electrolyte solution from the viscosity of the internal electrolyte solution is preferably greater than 0.1 mPa·s for this nonaqueous electrolyte secondary battery. This supports an even more reliable and secure maintenance of the battery characteristics at high levels in repetitive high-rate charge/discharge applications.

The composition of the solvent in the internal electrolyte solution is preferably different in this nonaqueous electrolyte secondary battery from the composition of the solvent in the external electrolyte solution. In this nonaqueous electrolyte secondary battery, the internal electrolyte solution and the external electrolyte solution both preferably contain dimethyl carbonate (DMC) as a solvent component, and the volumetric proportion of the DC in the solvent in the external electrolyte solution is preferably higher than the volumetric proportion of the DC in the solvent in the internal electrolyte solution. The solvent in the internal electrolyte solution and the solvent in the external electrolyte solution are preferably both a mixture of ethylene carbonate (EC), DC, and ethyl methyl carbonate (EMC) in this nonaqueous electrolyte secondary battery. The external electrolyte solution in this nonaqueous electrolyte secondary battery is preferably collected at the bottom of the battery case outside the wound electrode assembly.

A second aspect of the invention relates to a method of producing a nonaqueous electrolyte secondary battery that includes a battery case, a wound electrode assembly, a first nonaqueous electrolyte solution, and a second nonaqueous electrolyte solution. This production method includes preparing the wound electrode assembly; housing the wound electrode assembly in the battery case; establishing a vacuum in the battery case and introducing into the battery case the first nonaqueous electrolyte solution in an amount corresponding to an open space in the wound electrode assembly; and introducing into the battery case, after the introduction of the first nonaqueous electrolyte solution, the second nonaqueous electrolyte solution having a lower viscosity than that of the first nonaqueous electrolyte solution. In this instance, the viscosity of the internal electrolyte solution can be adjusted through the first nonaqueous electrolyte solution and the viscosity of the external electrolyte solution can be adjusted through the second nonaqueous electrolyte solution. The preceding makes it possible to realize a nonaqueous electrolyte secondary battery in which, as indicated above, the viscosity of the internal electrolyte solution is greater than the viscosity of the external electrolyte solution.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the herein proposed nonaqueous electrolyte secondary battery is described below. The embodiment described here should of course not be construed as a particular limitation on the invention. In addition, each of the diagrams has been executed as a schematic and the dimensional relationships (length, width, thickness, and so forth) in each diagram do not reflect actual dimensional relationships. Members, and positions that exhibit the same functionality have been assigned the same reference number, and duplicative descriptions thereof have either been omitted or simplified.

A description is first provided here of a lithium ion secondary battery 10 that is an example of the structure of an applicable nonaqueous electrolyte secondary battery. This is followed by a description of the herein proposed nonaqueous electrolyte secondary battery.

《《The Lithium Ion Secondary Battery 10》》

Figure 1:
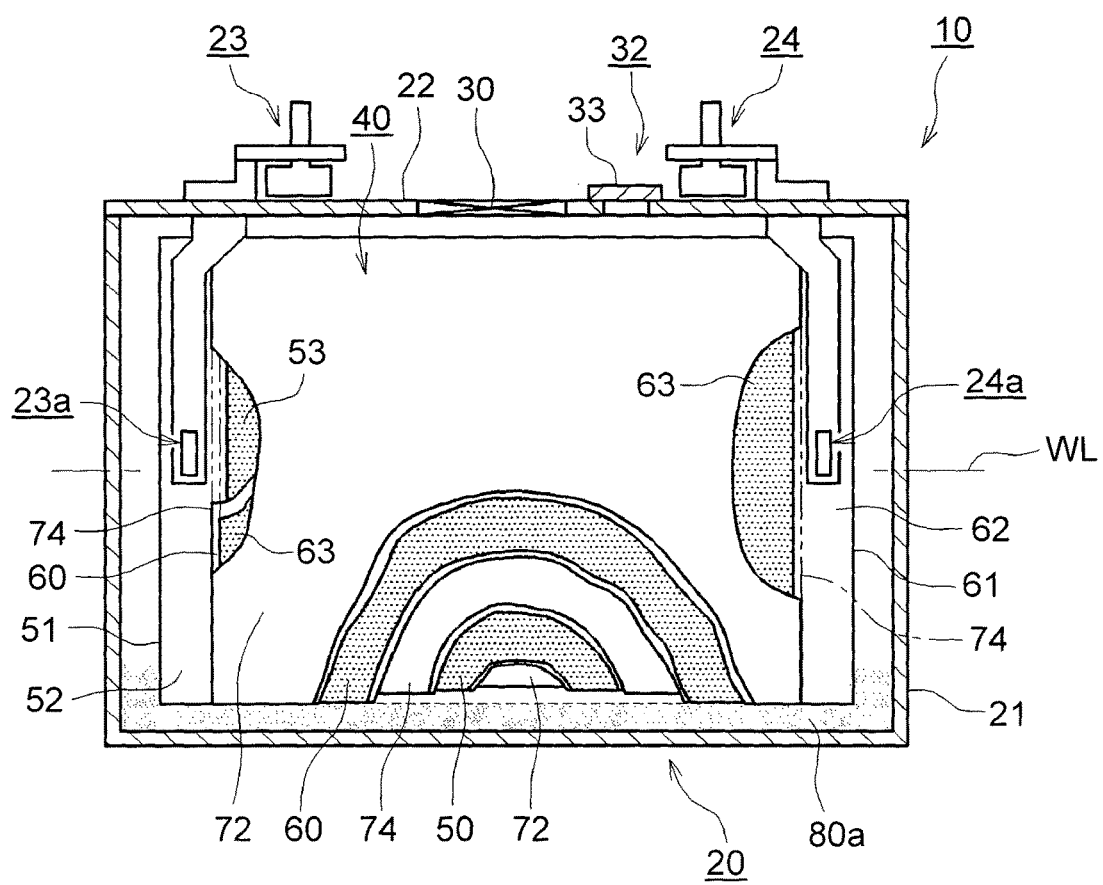
FIG. 1 is a partial cross-sectional diagram that shows a lithium ion secondary battery.
Figure 2:
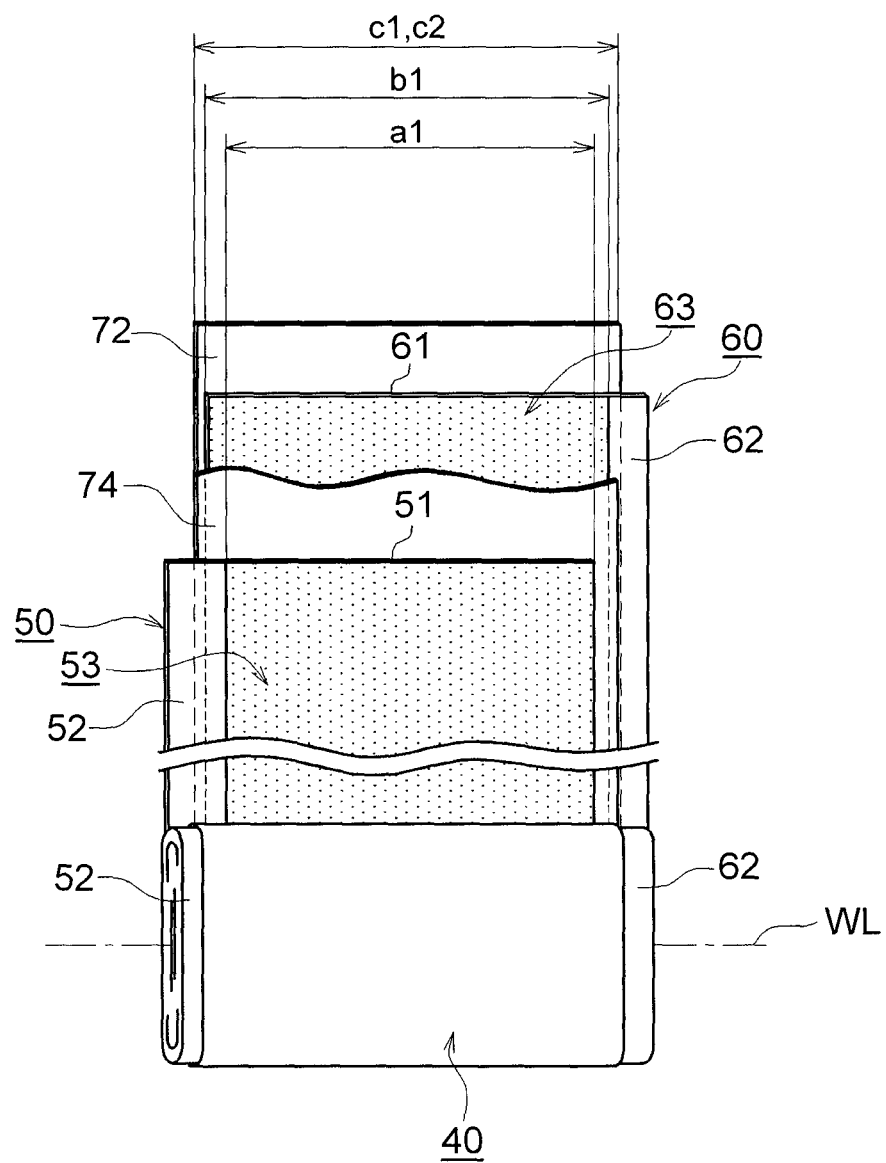
FIG. 2 is a diagram that shows an electrode assembly for installation in a lithium ion secondary battery.

FIG. 1 is a cross-sectional diagram that shows the lithium ion secondary battery 10. FIG. 2 is a diagram that shows an electrode assembly 40 that can be installed in this lithium ion secondary battery 10. The lithium ion secondary battery 10 shown in FIGS. 1 and 2 represents nothing more than an example of a lithium ion secondary battery to which the invention may be applied and does not constitute a particular limitation on lithium ion secondary batteries to which the invention may be applied.

As shown in FIG. 1, the lithium ion secondary battery 10 is provided with a battery case 20 and an electrode assembly 40 (a wound electrode assembly in FIG. 1).

《The Battery Case 20》

The battery case 20 is provided with a case main body 21 and a sealing plate 22. The case main body 21 has the shape of a box that has an opening at one end. Here, the case main body 21 has the shape of a rectangular parallelepiped that is provided with a bottom and that is open at one end, which end corresponds to the upper side in the normal use configuration of the lithium ion secondary battery 10. A rectangular opening is formed in the case main body 21 in this embodiment. The sealing plate 22 is a member that closes the opening in the case main body 21. The sealing plate 22 is constructed of an approximately rectangular plate. A battery case 20 with an approximately hexahedral shape is constructed by welding this sealing plate 22 to the rim of the opening in the case main body 21.

With regard to the material of the battery case 20, for example, the use is preferred of a battery case 20 constructed mainly of a metal material that is light and that has an excellent thermal conductivity. Such metal materials can be exemplified by aluminum, stainless steel, and nickel-plated steel. The battery case 20 (the case main body 21 plus the sealing plate 22) according to this embodiment is constructed of aluminum or an alloy that is mainly aluminum.

In the example shown in FIG. 1, a positive electrode terminal 23 for external connection (an external terminal) and a negative electrode terminal 24 (an external terminal) are provided in the sealing plate 22. A safety valve 30 and a liquid fill port 32 are formed in the sealing plate 22. The safety valve 30 is constructed to open and release the internal pressure when the internal pressure in the battery case 20 rises to reach or exceed a prescribed level (for example, a valve-opening set pressure of about 0.3 MPa to 1.0 MPa). A state is shown in FIG. 1 in which the electrolyte solution has been introduced and the liquid fill port 32 has then been sealed shut with a sealant material 33. The electrode assembly 40 is housed in this battery case 20.

《The Electrode Assembly 40 (Wound Electrode Assembly)》

As shown in FIG. 2, the electrode assembly 40 is provided with a strip-shaped positive electrode (the positive electrode sheet 50), a strip-shaped negative electrode (the negative electrode sheet 60), and strip-shaped separators (separators 72 and 74).

《The Positive Electrode Sheet 50》

The positive electrode sheet 50 is provided with a strip-shaped positive electrode current collector foil 51 and a positive electrode active material layer 53. A metal foil suitable for positive electrodes is preferably used for the positive electrode current collector foil 51. For example, a strip-shaped aluminum foil with a prescribed width and a thickness of approximately 15 μm can be used for the positive electrode current collector foil 51. An exposed area 52 is disposed along an edge on one side, considered in the width direction, of the positive electrode current collector foil 51. In the example in the figures, the positive electrode active material layer 53 is formed on both sides of the positive electrode current collector foil 51, excluding the exposed area 52 disposed on the positive electrode current collector foil 51. Here, the positive electrode active material layer 53 is supported on the positive electrode current collector foil 51 and contains at least a positive electrode active material. In the embodiment under consideration, the positive electrode active material layer 53 is provided by coating a positive electrode mixture containing a positive electrode active material on the positive electrode current collector foil 51. In addition, the "exposed area 52" refers to a location on the positive electrode current collector foil 51 where the positive electrode active material layer 53 is not supported (coated, formed).

One or two or more of the substances heretofore used in lithium ion batteries can be used without particular limitation for the positive electrode active material. The following are favorable examples: oxides that contain lithium and a transition metal element as constituent metal elements (lithium transition metal oxides), e.g., lithium nickel oxide (for example, $LiNiO_2$), lithium cobalt oxide (for example, $LiCoO_2$), and lithium manganese oxide (for example, $LiMn_2O_4$), and phosphate salts that contain lithium and a transition metal element as constituent metal elements, e.g., lithium manganese phosphate ($LiMnPO_4$) and lithium' iron phosphate ($LiFePO_4$).

《Electroconductive Materials》

Electroconductive materials can be exemplified by carbon materials such as carbon powder and carbon fiber. A single selection from such electroconductive materials may be used by itself or two or more selections may be used in combination. Various carbon blacks (for example, acetylene black, oil furnace black, graphitized carbon black, carbon black, graphite, Ketjen black) and carbon powders such as graphite powder can be used for the carbon powder.

《Binders》

The binder bonds with the electroconductive material particles and the positive electrode active material particles present in the positive electrode active material layer 53 and binds these particles to the positive electrode current collector foil 51. Polymers soluble or dispersible in the solvent used can be used as this binder. For example, water-soluble or water-dispersible polymers, e.g., cellulosic polymers (e.g., carboxymethyl cellulose (CMC) and hydroxypropyl methyl cellulose (HPMC)), fluororesins, polytetrafluoroethylene (PTFE), and tetrafluoroethylene-hexafluoropropylene (FEP)), and rubbers (vinyl acetate copolymers, styrene-butadiene rubber (SBR) copolymers, and acrylic acid-modified SBR resins (SBR latexes)), are preferably used in a positive electrode mixture composition that uses an aqueous solvent. Polymers such as polyvinylidene fluoride (PVDF), polyvinylidene chloride (PVDC), and polyacrylonitrile (PAN) are preferably used in a positive electrode mixture composition that uses a nonaqueous solvent.

«The Negative Electrode Sheet 60»

As shown in FIG. 2, the negative electrode sheet 60 is, provided with a strip-shaped negative electrode current collector foil 61 and a negative electrode active material layer 63. A metal foil suitable for negative electrodes is preferably used for the negative electrode current collector foil 61. A strip-shaped copper foil with a prescribed width and a thickness of approximately 10 µm is used for this negative electrode current collector foil 61. An exposed area 62 is disposed along an edge on one side, considered in the width direction, of the negative electrode current collector foil 61. The negative electrode active material layer 63 is formed on both sides of the negative electrode current collector foil 61, excluding the exposed area 62 disposed on the negative electrode current collector foil 61. The negative electrode active material layer 63 is supported on the negative electrode current collector foil 61 and contains at least a negative electrode active material. In the embodiment under consideration, the negative electrode active material layer 63 is provided by coating a negative electrode mixture containing a negative electrode active material on the negative electrode current collector foil 61. In addition, the "exposed area 62" refers to a location on the negative electrode current collector foil 61 where the negative electrode active material layer 63 is not supported (coated, formed).

«The Negative Electrode Active Material»

One or two or more of the substances heretofore used in lithium ion batteries can be used without particular limitation for the negative electrode active material. Favorable examples are carbonaceous materials such as graphite carbon and amorphous carbon, lithium transition metal oxides, and lithium transition metal nitrides.

«The Separators 72, 74»

As shown in FIG. 2, the separators 72, 74 are members that separate the positive electrode sheet 50 from the negative electrode sheet 60. In this example, the separators 72, 74 are constructed of a strip-shaped sheet material having a specified width and a plurality of microfine pores. A porous film made of a resin, for example, a separator having a single-layer structure and made of porous polyolefin resin or a separator having a laminated structure and made of porous polyolefin resin, can be used for the separators 72, 74. As shown in FIG. 2, in this example the width b1 of the negative electrode active material layer 63 is slightly larger than the width a1 of the positive electrode active material layer 53. The widths c1 and c2 of the separators 72, 74 are also slightly larger than the width b1 of the negative electrode active material layer 63 (c1, c2>b1>a1).

The separators 72, 74 insulate the positive electrode active material layer 53 from the negative electrode active material layer 63 and also permit the movement of the electrolyte. While omitted from the figures, a heat resistance layer may be formed in the separators 72, 74 on the surface of the porous plastic film substrate. This heat resistance layer contains a filler and a binder. The heat resistance layer is also referred to as an HRL.

«Installation of the Electrode Assembly 40»

As shown in FIG. 2, in this embodiment the electrode assembly 40 is pressed flat along a single plane that contains the winding axis WL. In the example shown in FIG. 2, the exposed area 52 of the positive electrode current collector foil 51 and the exposed area 62 of the negative electrode current collector foil 61 are exposed in a spiral shape at the two sides of the separators 72, 74, respectively. As shown in FIG. 1, in this embodiment the middle areas of the positive and negative exposed areas 52, 62 that protrude out from the separators 72, 74 are brought together in the electrode assembly 40 and are welded to end areas 23a, 24a of positive and negative internal terminals 23, 24 disposed within the battery case 20.

As shown in FIG. 1, the electrode assembly 40 is housed in the battery case 20. An electrolyte solution is also filled into the battery case 20. The electrolyte solution impregnates into the interior of the electrode assembly 40 from both sides considered in the axial direction of the winding axis WL (refer to FIG. 2).

«The Electrolyte Solution (Liquid Electrolyte)»

The same nonaqueous electrolyte solutions as heretofore used in lithium ion batteries can be used without particular limitation as the electrolyte solution. This nonaqueous electrolyte solution typically has a composition in which a supporting salt is incorporated in a suitable nonaqueous solvent. For example, a single selection or a plurality of selections from the group consisting of (EC), propylene carbonate, DMC, diethyl carbonate, EMC, 1,2-dimethoxyethane, 1,2-diethoxyethane, tetrahydrofuran, 1,3-dioxolane, and so forth, can be used as the nonaqueous solvent. For example, lithium salts such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, and so forth, can be used as the supporting salt. One example here is a nonaqueous electrolyte solution provided by the incorporation of $LiPF_6$ at a concentration of approximately 1 mol/L in a mixed solvent of EC and diethyl carbonate (for example, at a volumetric ratio of 1:1).

The positive electrode current collector foil 51 and the negative electrode current collector foil 61 of this lithium ion secondary battery 10 are electrically connected to an outside device through the electrode terminals 23, 24 that penetrate through the battery case 20. The behavior of the lithium ion secondary battery 10 during charging and during discharge is described in the following.

«The Behavior During Charging»

Figure 3:
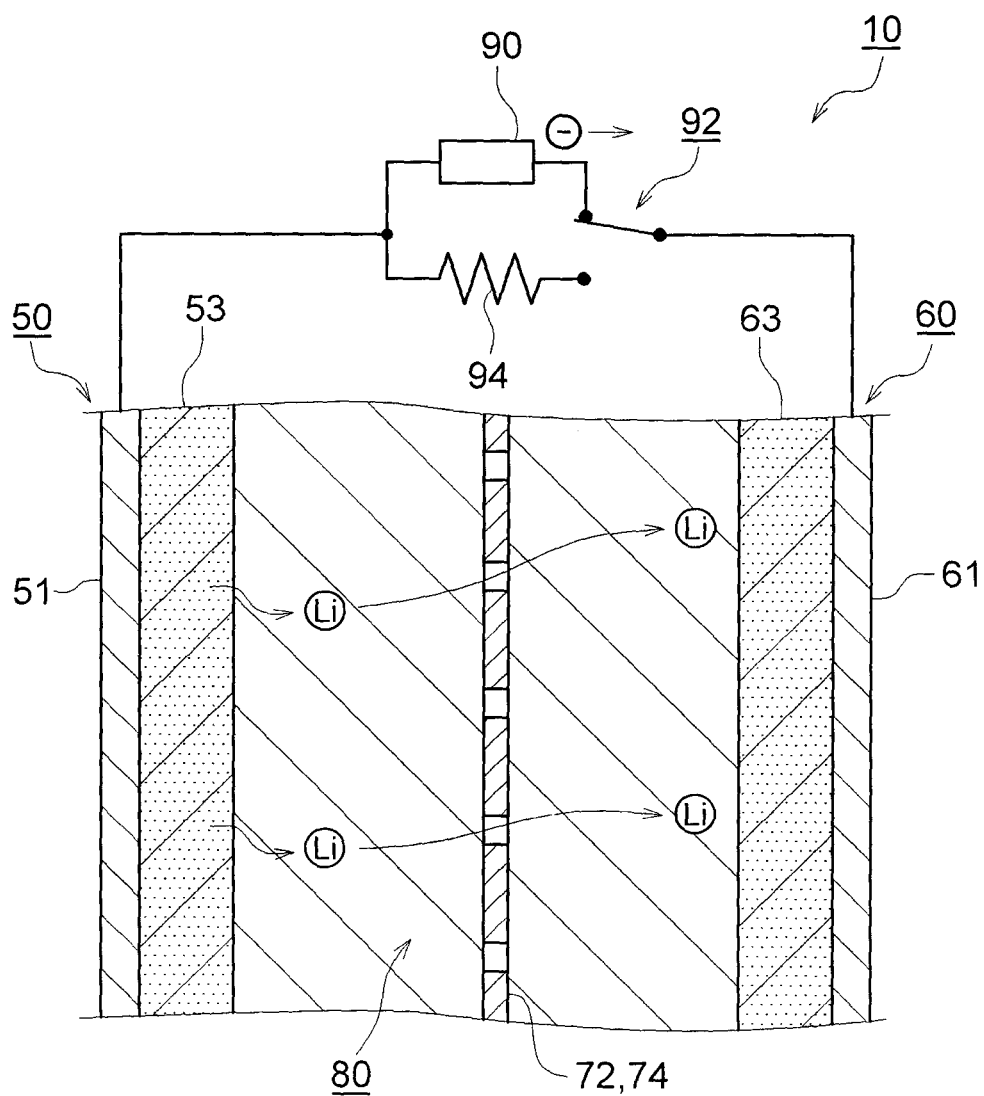
FIG. 3 is a schematic diagram that shows the state during the charging of a lithium ion secondary battery.

The state during charging of the lithium ion secondary battery 10 is shown schematically in FIG. 3. During charging, the electrode terminals 23, 24 (refer to FIG. 1) of the lithium ion secondary battery 10 are placed, using a switch 92, in a state in which they are electrically connected to a charger 90, as shown in FIG. 3. At this time, through the operation of the charger 90, a voltage is applied between the positive electrode sheet 50 and the negative electrode sheet 60 and lithium ion (Li) is extracted into the electrolyte solution 80 from the positive electrode active material in the positive electrode active material layer 53 and charge is extracted from the positive electrode active material layer 53. The extracted charge is transported to the positive electrode current collector foil 51 and is transported through the charger 90 to the negative electrode sheet 60. The charge accumulates at the negative electrode sheet 60 while the lithium ion (Li) in the electrolyte solution 80 is taken up by and inserted into and then stored in the negative electrode active material in the negative electrode active material layer 63. This results in the production of a potential difference between the negative electrode sheet 60 and the positive electrode sheet 50.

«The Behavior During Discharge»

Figure 4:
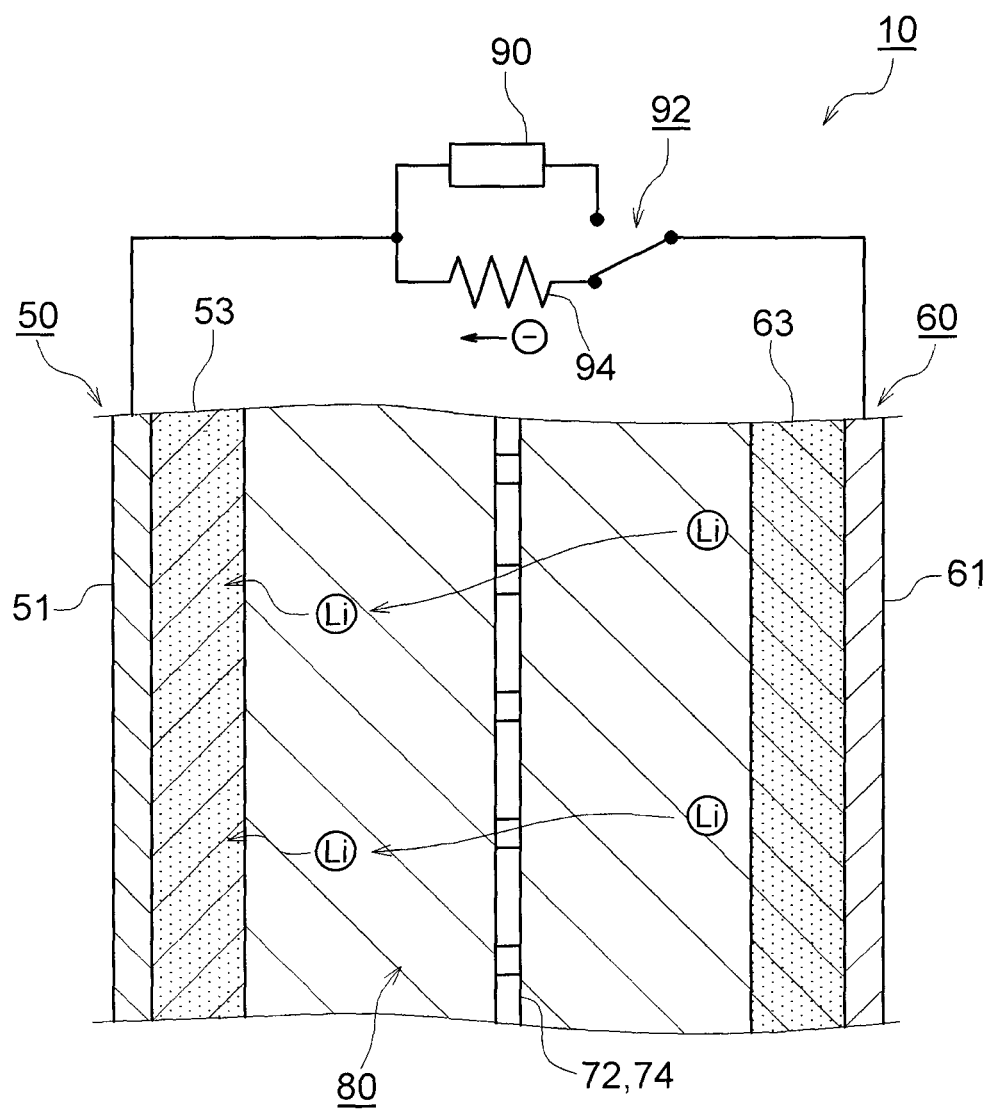
FIG. 4 is a schematic diagram that shows the state during the discharge of a lithium ion secondary battery.

The state during discharge of the lithium ion secondary battery 10 is shown schematically in FIG. 4. During discharge, the electrode terminals 23, 24 (refer to FIG. 1) of the lithium ion secondary battery 10 are placed, using the switch 92, in a state in which they are electrically connected to a resistance 94, as shown in FIG. 4. At this time, due to the potential difference between the negative electrode sheet 60 and the positive electrode sheet 50, charge travels from the negative electrode sheet 60 through the resistance 94 to the positive electrode sheet 50 and the lithium ion inserted in the negative electrode active material layer 63 is extracted into the electrolyte solution 80. At the positive electrode, the lithium ions in the electrolyte solution 80 are incorporated, in the positive electrode active material in the positive electrode active material layer 53.

During this charge/discharge of the lithium ion secondary battery 10, the lithium ion is inserted into or extracted from the positive electrode active material in, the positive electrode active material layer 53 or the negative electrode active material in the negative electrode active material layer 63. In addition, the lithium ion shuttles between the positive electrode active material layer 53 and the negative electrode active material layer 63 through the intermediary of the electrolyte solution 80.

«Characteristics of Vehicular Applications»

Such a lithium ion secondary battery 10 can realize, for example, high outputs in excess of 4 V. Due to this, it can be advantageously used as a motive power source for hybrid vehicles and electric vehicles, where high outputs are required in particular during take off and acceleration. Moreover, the lithium ion secondary battery 10 has a high charging efficiency and can also be used for rapid charging; for example, it can also be used in an energy regeneration system in which charging is performed using the electrical energy regenerated from kinetic energy during vehicle deceleration (braking). Acceleration and deceleration are performed repeatedly in vehicular service, particularly during urban travel. This is accompanied by repeated high-output discharge and rapid charging when the lithium ion secondary battery 10 is used for the motive power source of an electric vehicle or hybrid vehicle. Due to this, increases in the battery resistance are desirably kept low in applications where this high-rate charge/discharge occurs repetitively.

«Deterioration of the Battery Characteristics in High-rate Continuous Charge/discharge Service»

The inventor discovered that the battery characteristics assume a deteriorating trend, e.g., the resistance increases and the output declines, when a wound electrode assembly 40-equipped lithium ion secondary battery 10 (nonaqueous electrolyte secondary battery) as shown in FIG. 1 is used in applications where rapid charging and rapid discharge occur repetitively (high-rate continuous charge/discharge service). The inventor believes that this trend is due to a decline in the electrolyte (electrolyte solution) present in the interior of the wound electrode assembly 40.

Thus, during the charging of the wound electrode assembly 40-equipped lithium ion secondary battery 10 as shown in FIG. 1, the positive electrode active material layer 53 releases the lithium ion and the negative electrode active material layer 63 takes up the lithium ion. At this time, the positive electrode active material layer 53 contracts and the negative electrode active material layer 63 swells in correspondence to the degree of charging. During discharge, the positive electrode active material layer 53 takes up the lithium ion and the negative electrode active material layer 63 releases the lithium ion. At this time, the positive electrode active material layer 53 swells and the negative electrode active material layer 63 contracts in correspondence to the degree of discharge.

The positive electrode active material layer 53 and the negative electrode active material layer 63 undergo repetitive swelling and contraction in applications where rapid charging and rapid discharge occur repetitively. The rate of swelling and contraction is larger in such applications than when a gradual charging and discharge are repetitively performed, and the degree of swelling and contraction is also larger. As a consequence, the wound electrode assembly 40 acts like a pump in a certain sense and the nonaqueous electrolyte solution may then be expelled from the interior of the wound electrode assembly 40. When the nonaqueous electrolyte solution is expelled from the interior of the wound electrode assembly 40, the interior of the wound electrode assembly 40 then becomes deficient in the electrolyte (lithium ion for the lithium ion secondary battery 10) required for charge/discharge. This results in a deterioration of the battery characteristics, e.g., the lithium ion secondary battery 10 experiences a rise in resistance and a decline in its input/output characteristics. The inventor believes that this is one cause of battery performance deterioration, e.g., increased resistance for the lithium ion secondary battery 10 and reductions in its input/output characteristics. Based on this hypothesis the inventor conceived of a novel structure that maintains the input/output characteristics of the secondary battery at high levels.

«The Novel Proposal for the Lithium Ion Secondary Battery 10»

Within the nonaqueous electrolyte solution 80 (refer to FIG. 3) contained in the battery case 20, as shown in FIG. 1, letting α be the viscosity of the internal electrolyte solution (not shown) present in the interior of the wound electrode assembly 40 and β be the viscosity of the external electrolyte solution 80*a* collected at the bottom of the battery case 20, α>β for the herein proposed lithium ion secondary battery 10. Stated differently, the viscosity of the nonaqueous electrolyte solution that is present outside the wound electrode assembly 40 (the external electrolyte solution 80*a*) is lower than that of the nonaqueous electrolyte solution impregnated in the interior of the wound electrode assembly 40.

In such a case, the nonaqueous electrolyte solution impregnated in the interior of the wound electrode assembly 40, due to its higher viscosity, resists expulsion to the outside of the wound electrode assembly 40. In contrast, the nonaqueous electrolyte solution present outside the wound electrode assembly 40, due to its lower viscosity, readily enters into the wound electrode assembly 40. As a consequence, the expulsion of the nonaqueous electrolyte solution from the interior of the wound electrode assembly 40 can be suppressed even when the positive electrode active material layer 53 and the negative electrode active material layer 63 undergo repetitive swelling and contraction in applications where repetitive high-rate charge/discharge occurs. In contrast, the nonaqueous electrolyte solution is readily taken into the interior of the wound electrode assembly 40. As a consequence, the electrolyte required for charge/discharge (the lithium ion in the lithium ion secondary battery 10) can be maintained in the interior of the wound electrode assembly 40. The deterioration in the battery characteristics, e.g., an increase in the resistance of the lithium ion secondary battery 10 and a decline in its input/output characteristics, can be prevented as a result.

Here, the difference (α−β) between the viscosity α of the internal electrolyte solution (not shown) and the viscosity β of the external electrolyte solution 80*a* is, for example, preferably greater than 0.1 mPa·s ((α−β)>0.1 mPa·s). This establishes a clear and distinct difference between the viscosities of the internal electrolyte solution (not shown) and the external electrolyte solution 80*a* and thereby supports a more reliable and certain appearance of the effect of preventing a deterioration in the battery characteristics, e.g., an increase in the resistance of the lithium ion secondary battery 10 and a decline in its input/output characteristics. The difference (α–β) between the viscosity α of the internal electrolyte solution (not shown) and the viscosity β of the external electrolyte solution 80a is, for example, preferably greater than 0.5 mPa·s, more preferably greater than 1 mPa·s, even more preferably greater than 3 mPa·s, and even more preferably greater than 5 mPa·s. The difference (α–β) between the viscosity α of the internal electrolyte solution (not shown) and the viscosity β of the external electrolyte solution 80a is, for example, preferably less than 15 mPa·s, more preferably less than 13 mPa·s, and even more preferably less than 10 mPa·s. The viscosity of these nonaqueous electrolyte solutions can be measured using common viscometers that are capable of evaluating the viscosity of nonaqueous electrolyte solutions (for example, a cone/plate viscometer). The viscosity of the internal electrolyte solution is, for example, preferably greater than 1.0 mPa·s and more preferably greater than 1.2 mPa·s.

In addition, the solvent composition in the nonaqueous electrolyte solution is different between the internal electrolyte solution (not shown) present in the interior of the wound electrode assembly 40 and the external electrolyte solution 80a. For example, for a nonaqueous electrolyte solution containing DMC, the viscosity declines as the volumetric proportion of the DMC increases. Due to this, when both the internal electrolyte solution and the external electrolyte solution 80a contain DMC in their solvent composition, the volumetric proportion of the DMC in the solvent in the external electrolyte solution 80a is preferably higher than that in the internal electrolyte solution. Specifically, when the solvents in the internal electrolyte solution and the external electrolyte solution 80a are both mixtures of EC, DMC, and EMC, the volumetric proportion of the DMC in the solvent for the external electrolyte solution 80a is preferably higher than that for the internal electrolyte solution. In this case, the volumetric proportion for the DMC may be adjusted while raising or lowering the volumetric proportion of the EC or EMC.

In addition, the method of producing the nonaqueous electrolyte secondary battery may contain, for example, a step of preparing the wound electrode assembly 40, a step of housing the wound electrode assembly 40 in the battery case 20, and a step of filling electrolyte solution into the battery case 20. In addition, the step of filling electrolyte solution into the battery case 20 may contain a first fill step and a second fill step. This first fill step is a step in which the battery case 20 is placed under a vacuum and a first nonaqueous electrolyte solution is filled in an amount corresponding to the open space in the wound electrode assembly 40 (the open space of the interior of the wound electrode assembly 40). The second fill step is a step in which, after the introduction of the first nonaqueous electrolyte solution, a second nonaqueous electrolyte solution having a lower viscosity than that of the first nonaqueous electrolyte solution is filled into the battery case 20. Performing the preceding provides a nonaqueous electrolyte secondary battery in which the viscosity of the external electrolyte solution 80a is different from that of the internal electrolyte solution present in the interior of the wound electrode assembly 40.

In another method, for example, in the first fill step the battery case 20 may be placed under a vacuum and a first nonaqueous electrolyte solution may be filled in an amount larger than the amount corresponding to the open space in the wound electrode assembly 40 (the open space of the interior of the wound electrode assembly 40) and the excess electrolyte solution may then be suctioned out of the battery case 20. In this case, the process for suctioning out the excess electrolyte solution in the battery case 20 may be a process, for example, in which the tip of a dropper is extended to the bottom of the battery case 20 through a gap in the interior of the battery case 20 and the excess electrolyte solution collected at the bottom of the battery case 20 is then suctioned out using this dropper.

In this case, the amount corresponding to the open space in the wound electrode assembly is preferably determined in advance by calculation or measurement. The "amount corresponding to the open space in the wound electrode assembly" does not necessarily strictly agree with the "volume of the open space in the wound electrode assembly". The "amount corresponding to the open space in the wound electrode assembly" may be approximately the amount equivalent to the "volume of the open spate in the wound electrode assembly"; for example, the "amount corresponding to the open space in the wound electrode assembly" may be within approximately ±40%, preferably within approximately ±20%, and more preferably within approximately ±10% of the "volume of the open space in the wound electrode assembly".

The "first nonaqueous electrolyte solution" is impregnated into the interior of the wound electrode assembly 40 and mainly becomes the internal electrolyte solution. The "second nonaqueous electrolyte solution" mainly collects outside the wound electrode assembly 40 to become the external electrolyte solution. The "first nonaqueous electrolyte solution" and the "second nonaqueous electrolyte solution" are preferably prepared in advance and the viscosity is preferably adjusted in advance using predetermined volumetric proportions for the solvent.

As described in the following, the inventor examined the trends exhibited by the battery characteristics with respect to the viscosity of the internal electrolyte solution and the viscosity of the external electrolyte solution by carrying out various tests by preparing a variety of the aforementioned first and second nonaqueous electrolyte solutions and fabricating test batteries (evaluation cells) having different viscosities for the internal electrolyte solution and the external electrolyte solution. An example of these tests is provided in the following.

«The Evaluation Cell»

The evaluation cell prepared for the test examples in Table 1 will be described first. Reference is made as appropriate to FIGS. 1 to 5 for the structure of the evaluation cell.

«The Positive Electrode in the Evaluation Cell»

A positive electrode mixture was prepared in order to form the positive electrode active material layer 53 for the positive electrode. For this positive electrode mixture, a ternary lithium transition metal oxide ($LiNi_{1/3}Co_{1/3}Mn_{1/3}O_2$) was used as the positive electrode active material, an acetylene black (AB) was used for the electroconductive material, and PVDF was used for the binder. Positive electrode active material:electroconductive material:binder=90:8:2 was used for the mass ratio among the positive electrode active material, electroconductive material, and binder. The positive electrode mixture was prepared by mixing the positive electrode active material, electroconductive material, and binder with ion-exchanged water. The positive electrode active material was then coated and dried on a positive electrode current collector foil 51 one side at a time to produce a positive electrode (positive electrode sheet) in which a positive electrode active material layer 53 was coated on both sides of the positive electrode current collector foil 51.

An aluminum foil (thickness=15 µm) was used here as the positive electrode current collector foil 51. The amount of application of the positive electrode mixture on the positive electrode current collector foil 51 was approximately equal between the two sides of the positive electrode current collector foil 51 and was set at from at least 9.8 mg/cm$^2$ to not more than 15.2 mg/cm$^2$ per one side of the positive electrode current collector foil 51 after the positive electrode mixture had been dried. The mixture density for the positive electrode active material layer 53 was brought to from at least 1.8 g/cm$^3$ to not more than 2.8 g/cm$^3$ by rolling using a roller press after drying. In the evaluation cell being provided as an example here, the amount of application of the positive electrode active material was set at 11 mg/cm$^2$ per one side of the positive electrode current collector foil 51. The mixture density of the positive electrode active material layer 53 after rolling was 2.2 g/cm$^3$.

«The Negative Electrode in the Evaluation Cell»

A negative electrode mixture was prepared in order to form the negative electrode active material layer 63 for the negative electrode. For the negative electrode mixture, amorphous-coated graphite was used as the negative electrode active material, CMC was used as a thickener, and a binder was used. SBR, which is a rubber-type binder, was used as the binder. Negative electrode active material:CMC: SBR=98:1:1 was used for the mass ratio among the negative electrode active material, thickener (CMC), and binder (SBR). A negative electrode mixture was prepared by mixing the negative electrode active material, CMC, and SBR with ion-exchanged water. The negative electrode active material was then coated and dried on a negative electrode current collector foil 61 one side at a time to produce a negative electrode (negative electrode sheet) in which a negative electrode active material layer 63 was coated on both sides of the negative electrode current collector foil 61.

A copper foil (thickness=10 µm) was used here as the negative electrode current collector foil 61. The amount of application of the negative electrode mixture on the negative electrode current collector foil 61 was approximately equal between the two sides of the negative electrode current collector foil 61 and was set at from at least 4.8 mg/cm$^2$ to not more than 10.2 mg/cm$^2$ per one side of the negative electrode current collector foil 61 after the negative electrode mixture had been dried. The mixture density for the negative electrode active material layer 63 was brought to from at least 0.8 g/cm$^3$ to not more than 1.4 g/cm$^3$ by rolling using a roller press after drying. In the evaluation cell being provided as an example here, the amount of application of the negative electrode active material was set at 7.2 mg/cm$^2$ per one side of the negative electrode current collector foil 61. The mixture density of the negative electrode active material layer 63 was 1.1 g/cm$^3$ after rolling.

«The Base Material for the Separator in the Evaluation Cell»

A porous sheet of polypropylene (PP) and polyethylene (PE) with a three-layer (PP/PE/PP) structure was selected as suitable for the base material of the separator.

«Assembly of the Evaluation Cell»

A flat rectangular evaluation cell was fabricated as the evaluation cell under consideration. Thus, a wound electrode assembly 40 fabricated using the positive electrode sheet, negative electrode sheet, and separator was pressed flat and housed in a rectangular battery case followed by filling, with nonaqueous electrolyte solution and sealing to produce a flat rectangular evaluation cell.

The specifications for the wound electrode assembly 40 (refer to FIG. 2) were specifically defined and were the same for each sample. For example, here, the wound electrode assembly 40, when pressed flat and housed in the battery case 20, had approximately the following dimensions. For the wound electrode assembly 40, width (L1): 125 mm, height (L2): 55 mm, and thickness (maximum thickness in the pressed flat state): 12 mm were used here. For the positive electrode sheet 50, the mixture density was 2.2 g/cm$^3$, the thickness was 65 µm (foil=15 µm), the length was 3 m, the width was 115 mm (a2), and the coated width was 98 mm (a1). For the negative electrode sheet 60, the mixture density was 1.1 g/cm$^3$, the thickness was 77 µm (foil=10 µm), the length was 3.1 m, the width was 117 mm (b2), and the coated width was 102 mm (b1).

Figure 5:
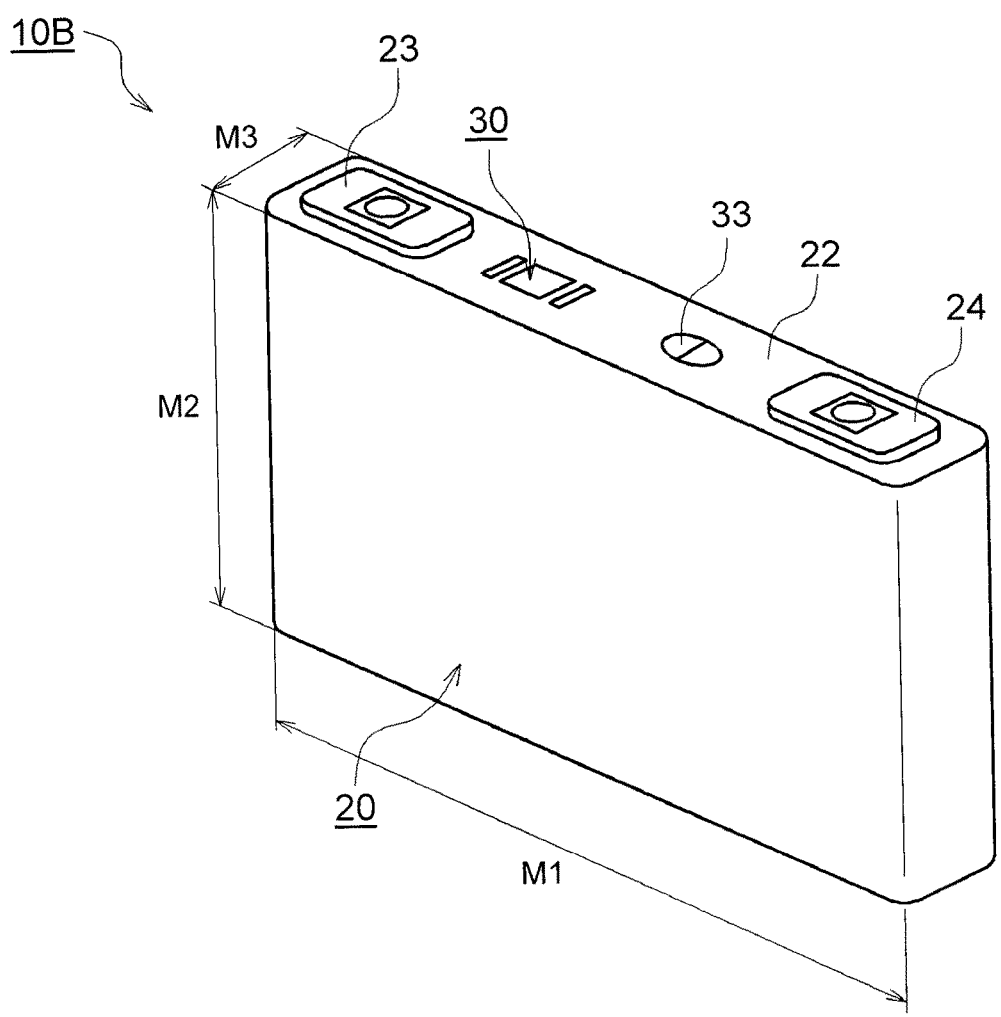
FIG. 5 is a perspective diagram of a cell used for evaluation.

A perspective diagram of the evaluation cell is given in FIG. 5. The battery case 20 here is an aluminum case. This battery case 20 had approximately the following dimensions. The external dimensions of the battery case 20 were as follows: length of the long side (M1): 137 mm, length of the short side (M2): 63.1 mm, and thickness (M3): 13.3 mm. The internal dimensions of the battery case 20 were as follows: length of the long side: 135.6 mm, length of the short side: 62.4 mm, and thickness: 12.5 mm. In addition, for this evaluation cell, a plastic sheet was applied to each of the two planes framed by the long side (M1) and the short side (M2) of the battery case 20 and metal sheets were applied on top of these plastic sheets. Bolts were passed through the metal sheets outside the battery case 20 and tightening was performed with nuts. In this case the indicated planes of the battery case 20 were constrained by a pressure of 23 kgf/cm$^2$ at a state of charge (SOC) of 60% at 25° C.

«The Electrolyte Solution»

The nonaqueous electrolyte solution used here was an electrolyte solution provided by the dissolution of 1.1 mol/L LiPF$_6$ as the lithium salt in a mixed solvent of EC, DMC, and EMC at prescribed volumetric proportions (for example, EC:DMC:EMC=3:4:3). Various nonaqueous electrolyte solutions were prepared that had different volumetric proportions for the EC, DMC, and EMC in the solvent for the nonaqueous electrolyte solution and evaluation cells having different viscosities for the internal electrolyte solution and the external electrolyte solution 80a were thusly obtained.

In the step of filling the electrolyte solutions into the battery case 20, in this, case the battery case 20 was placed under a vacuum and the first nonaqueous electrolyte solution was filled in an amount corresponding to the open space in the wound electrode assembly 40, i.e., the open space in the interior of the wound electrode assembly 40 (the first fill step). Then, after the first nonaqueous electrolyte solution had been filled, the second nonaqueous electrolyte solution having a lower viscosity than the first nonaqueous electrolyte solution was filled into the battery case 20 (the second fill step). By doing this, a nonaqueous electrolyte secondary battery was obtained that had different viscosities for the external electrolyte solution 80a and the internal electrolyte solution present in the interior of the wound electrode assembly 40.

«Evaluation of the Evaluation Cell»

The thusly fabricated evaluation cell was, for example, submitted to a prescribed conditioning process and then submitted to an evaluation of the percentage increase in resistance after a pre-set high-rate cycling test.

«Conditioning»

After the electrolyte solutions had been introduced, the evaluation cell fabricated as described above was allowed to stand for about 10 hours and was then subjected to an initial charging. The conditioning process was carried out using a procedure 1 and a procedure 2 as follows. Procedure 1:

constant current (CC) charging at 1.5 C to 4 V, then pause for 5 minutes. Procedure 2: after procedure 1, charge by constant voltage charging and stop charging after 1.5 hours of charging or when the charging current reaches 0.1 A, then pause for 5. minutes.

«Measurement of the Rated Capacity»

After the conditioning process described above, the rated capacity of the evaluation cell was then measured using the following procedures 1 to 3 at a temperature of 25° C. and a voltage range from 3.0 V to 4.1 V. Procedure 1: after reaching 3.0 V by CC discharge at 1 C, discharge for 2 hours by constant voltage discharge and then pause for 10 seconds. Procedure 2: after reaching 4.1 V by CC charging at 1 C, charge for 2.5 hours by constant voltage charging and then pause for 10 seconds. Procedure 3: after reaching 3.0 V by CC discharge at 0.5 C, discharge for 2 hours by constant voltage discharge and then pause for 10 seconds. Rated capacity: the discharge capacity for discharge from the CC discharge through the constant voltage discharge in procedure 3 (constant current constant voltage (CCCV) discharge capacity) is taken to be the rated capacity. The rated capacity of this evaluation cell is about 4.0 Ah.

«Adjustment of the SOC»

The SOC is adjusted using the following procedures 1 and 2. This SOC adjustment is preferably carried out after the previously described conditioning process and measurement of the rated capacity. In order to make the influence of the temperature be constant, SOC adjustment is carried out in a 25° C. temperature environment in this case. The following procedures, for example, are used to adjust to a 60% SOC. Procedure 1: charge with a CC at 1 C from 3 V and bring to a SOC of approximately 60% of the rated capacity (60% SOC: 3.73 V). Procedure 2: after procedure 1, carry out constant voltage charging for 2.5 hours. Doing this can adjust the evaluation cell to a SOC of 60%. While adjustment of the SOC to 60% has been described here, the evaluation cell can be adjusted to any SOC by changing the SOC in procedure 1. For example, to adjust to an 80% SOC, the evaluation cell may be brought to a SOC of 80% of the rated capacity in procedure 1.

The evaluation cell was prepared for high-rate cycle testing by adjustment, after conditioning, to a 60% SOC in a 25° C. temperature environment. High-rate cycle testing was performed by repeating the following procedures I. to IV. a pre-set number of times (4000 cycles in this case). I. Discharge for 40 seconds at a CC of 75 A (CC discharge). II. Pause. for 5 seconds. III. Charge for 300 seconds at a CC of 10 A (CC charging). IV. Pause for 5 seconds. (Procedures I. to IV. are repeated for 4000 cycles).

The IV resistance of the evaluation cell was measured here at a SOC of 60% in a 25° C. environment before and after this high-rate cycle test.

⟨The Percentage Increase in Resistance (%)⟩

The IV resistance of the evaluation cell is increased by the high-rate cycle test described above. The percentage increase in resistance Z (%) is evaluated using Z (%)={Zb/Za}×100 where Za is the IV resistance measured before the high-rate cycle test and Zb is the IV resistance measured after the high-rate cycle test. Thus, the size of the IV resistance Zb measured after the high-rate cycle test with respect to the IV resistance Za measured before the high-rate cycle test is being evaluated here.

«Procedure for Measuring the IV Resistance»

For the IV resistance, the IV resistance was measured on the evaluation cell at a SOC of 60% in a 25° C. environment. For the IV resistance here, a CC discharge is carried out for 10 seconds at a pre-set current value (I) and the voltage (V) after the discharge is measured in each case. Based on the pre-set current value (I) and the post-discharge voltage (V), a plot is constructed taking I for the x-axis and V for the y-axis, and, based on the plot obtained for the individual discharges, an approximation straight line is drawn and its slope is taken to be the IV resistance. In this case, the CC discharge was carried out at current values of 0.3 C, 1 C, and 3 C and the IV resistance (mΩ) was obtained based on the voltage (V) obtained after each discharge.

The individual evaluation cells and their evaluations are given in Table 1.

TABLE 1

| sample | composition proportions and viscosity of the internal electrolyte solution (the first nonaqueous electrolyte solution) | | | | composition proportions and viscosity of the external electrolyte solution (the second nonaqueous electrolyte solution) | | | | percentage increase in resistance after high-rate charge/discharge (%) |
|---|---|---|---|---|---|---|---|---|---|
| | EC | DMC | EMC | viscosity | EC | DMC | EMC | viscosity | |
| sample 1 | 3 | 4 | 3 | 18.9 | 3 | 4 | 3 | 18.9 | 142.7 |
| sample 2 | 3 | 4 | 3 | 18.9 | 2 | 5 | 3 | 14.2 | 113.3 |
| sample 3 | 3 | 4 | 3 | 18.9 | 1 | 6 | 3 | 9.5 | 104.3 |
| sample 4 | 3 | 4 | 3 | 18.9 | 3 | 5 | 2 | 17.8 | 131.8 |
| sample 5 | 3 | 4 | 3 | 18.9 | 3 | 6 | 1 | 16.2 | 120.2 |
| sample 6 | 3 | 3 | 4 | 19.8 | 3 | 3 | 4 | 19.8 | 152.4 |
| sample 7 | 3 | 3 | 4 | 19.8 | 2 | 4 | 4 | 14.8 | 117.8 |
| sample 8 | 3 | 3 | 4 | 19.8 | 1 | 5 | 4 | 11.1 | 108.5 |
| sample 9 | 3 | 3 | 4 | 19.8 | 3 | 3 | 4 | 18.9 | 143.0 |
| sample 10 | 3 | 3 | 4 | 19.8 | 3 | 5 | 2 | 17.8 | 133.1 |

«The Percentage Increase in Resistance (%) after High-rate Cycle Testing»

The high-rate percentage increase in resistance (%) in Table 1 is the percentage increase in the IV resistance pre-versus-post-high-rate cycle testing as described below. The high-load characteristics of the evaluation cell were evaluated through this percentage increase in the IV resistance.

The volumetric proportions (or viscosity), for the solvent in the internal electrolyte solution actually present in the interior of the wound electrode assembly 40 are about the same as the volumetric proportions (or viscosity) for the first nonaqueous electrolyte solution. In addition, the volumetric proportions (or viscosity) for the solvent in the external electrolyte solution 80a actually collected at the bottom of the battery case 20 are about the same as the volumetric proportions (or viscosity) for the second nonaqueous electrolyte solution. Here, the composition and viscosity of the solvent in the internal electrolyte solution are specified based on the first nonaqueous electrolyte solution used when the battery case 20 is filled with the electrolyte solutions. The composition and viscosity of the solvent in the external electrolyte solution 80a are also specified based on the second nonaqueous electrolyte solution used when the battery case 20 is filled with the electrolyte solutions. The unit for viscosity in Table 1 is (mPa·s). Moreover, when considered rigorously, the volumetric proportions (or viscosity) of the solvent for the internal electrolyte solution actually present in the interior of the wound electrode assembly 40 and the volumetric proportions (or viscosity) of the solvent for the external electrolyte, solution 80a collected at the bottom of the battery case 20 may undergo small changes due to the testing, e.g., repetitive high-rate charge/discharge.

Furthermore, in the instant evaluation cells, the internal electrolyte solution actually present in the interior of the wound electrode assembly 40 can collect due to degradation of the evaluation cell. The external electrolyte solution 80a may be passed through a tube to the bottom of the battery case 20 through a gap between the battery case 20 and the wound electrode assembly 40, and the external electrolyte solution 80a resident at the bottom of the battery case 20 may be suctioned up by a dropper through this tube.

<Samples 1 to 5>

The same salt concentration was used for the internal electrolyte solution and the external electrolyte solution 80a in each of the samples and was 1.1 mol/L. EC:DMC:EMC=3:4:3 was used for the volumetric proportions in the solvent for the internal electrolyte solution (first nonaqueous electrolyte solution) in samples 1 to 5, while the volumetric proportions in the solvent for the external electrolyte solution 80a (second nonaqueous electrolyte solution) were varied. The internal electrolyte solution (first nonaqueous electrolyte solution), for which the volumetric proportions for the solvent were EC:DMC:EMC=3:4:3, had a viscosity of 18.9 (mPa·s).

<Sample 1>

The volumetric proportions in the solvent for the external electrolyte solution 80a (second nonaqueous electrolyte solution) are EC:DMC:EMC=3:4:3 for sample 1. Thus, for sample 1 the volumetric proportions for the solvent for the internal electrolyte solution (first nonaqueous electrolyte solution) and for the external electrolyte solution 80a (second nonaqueous electrolyte solution) were both EC:DMC:EMC=3:4:3 and these were the same nonaqueous electrolyte solution. Due to this, an evaluation cell in which the viscosities of the internal electrolyte solution and the external electrolyte solution 80a are about the same is obtained for sample 1. The percentage increase in resistance (%) for sample 1 was 142.7.

<Samples 2 and 3>

The volumetric proportions for the solvent in the external electrolyte solution 80a (second nonaqueous electrolyte solution) are EC:DMC:EMC=2:5:3 in sample 2. The viscosity of this external electrolyte solution 80a (second nonaqueous electrolyte solution) was 14.2 (mPa·s). The volumetric proportions for the solvent in the external electrolyte solution 80a (second nonaqueous electrolyte solution) are EC:DMC:EMC=1:6:3 in sample 3. The viscosity of this external electrolyte solution 80a (second nonaqueous electrolyte solution) was 9.5 (mPa·s).

The EC was reduced and the DMC was increased in sample 2 relative to sample 1 in the volumetric proportions for the solvent in the external electrolyte solution 80a (second nonaqueous electrolyte solution). As a result, the viscosity of the external electrolyte solution 80a of sample 2 is lower than in sample 1. The percentage increase in resistance (%) for sample 2 was 113.3. The EC was reduced and the DMC was increased in sample 3 relative to sample 2 in the volumetric proportions for the solvent in the external electrolyte solution 80a (second nonaqueous electrolyte solution). Due to this, the viscosity of the external electrolyte solution 80a of sample 3 is lower than in sample 2. The percentage increase in resistance (%) for sample 3 was 104.3.

<Samples 4 and 5>

The volumetric proportions for the solvent in the external electrolyte solution 80a (second nonaqueous electrolyte solution) are EC:DMC:EMC=3:5:2 in sample 4. The viscosity of this external electrolyte solution 80a (second nonaqueous electrolyte solution) was 17.8 (mPa·s). The volumetric proportions for the solvent in the external electrolyte solution 80a (second nonaqueous electrolyte solution) are EC:DMC:EMC=3:6:1 in sample 5. The viscosity of this external electrolyte solution 80a (second nonaqueous electrolyte solution) was 16.2 (mPa·s).

The EMC was reduced and the DMC was increased in sample 4 relative to sample 1 in the volumetric proportions for the solvent in the external electrolyte solution 80a (second nonaqueous electrolyte solution). As a result, the viscosity of the external electrolyte solution 80a of sample 4 is lower than in sample 1. The percentage increase in resistance (%) for sample 4 was 131.8. The EMC was reduced and the DMC was increased in sample 5 relative to sample 4 in the volumetric proportions for the solvent in the external electrolyte solution 80a (second nonaqueous electrolyte solution). Due to this, the viscosity of the external electrolyte solution 80a of sample 5 is lower than in sample 4. The percentage increase in resistance (%) for sample 5 was 120.2.

<Samples 6 to 10>

For samples 6 to 10, EC:DMC:EMC=3:3:4 is used for the volumetric proportions in the solvent for the internal electrolyte solution (first nonaqueous electrolyte solution) while the volumetric proportions in the solvent for the external electrolyte solution 80a (second nonaqueous electrolyte solution) are varied. The viscosity of the internal electrolyte solution (first nonaqueous electrolyte solution), for which the volumetric proportions in the solvent were EC:DMC:EMC=3:3:4, was 19.8 (mPa·s).

<Sample 6>

The volumetric proportions in the solvent for the external electrolyte solution 80a (second nonaqueous electrolyte solution) are EC:DMC:EMC=3:3:4 for sample 6. Thus, for sample 6 the volumetric proportions for the solvent for the internal electrolyte solution (first nonaqueous electrolyte solution) and the external electrolyte solution 80a (second nonaqueous electrolyte solution) were both EC:DMC:EMC=3:3:4 and these were the same nonaqueous electrolyte solution. Due to this, an evaluation cell in which the viscosities of the internal electrolyte solution and the external electrolyte solution 80a are about the same is obtained for sample 6. The percentage increase in resistance (%) for sample 6 was 152.4.

<Samples 7 and 8>

The volumetric proportions for the solvent in the external electrolyte solution 80a (second nonaqueous electrolyte solution) are EC:DMC:EMC=2:4:4 in sample 7. The viscosity of this external electrolyte solution 80a (second nonaqueous electrolyte solution) was 14.8 (mPa·s). The volumetric proportions for the solvent in the external electrolyte solution 80*a* (second nonaqueous electrolyte solution) are EC:DMC:EMC=1:5:4 in sample 8. The viscosity of this external electrolyte solution 80*a* (second nonaqueous electrolyte solution) was 11.1 (mPa·s).

The EC was reduced and the DMC was increased in sample 7 relative to sample 6 in the volumetric proportions for the solvent in the external electrolyte solution 80*a* (second nonaqueous electrolyte solution). As a result, the viscosity of the external electrolyte solution 80*a* for sample 7 is lower than for sample 6. The percentage increase in resistance (%) for sample 7 was 117.8. The EC was reduced and the DMC was increased in sample 8 relative to sample 7 in the volumetric proportions for the solvent in the external electrolyte solution 80*a* (second nonaqueous electrolyte solution). Due to this, the viscosity of the external electrolyte solution 80*a* of sample 8 is lower than in sample 7. The percentage increase in resistance (%) for sample 8 was 108.5.

<Samples 9 and 10>

The volumetric proportions for the solvent in the external electrolyte solution 80*a* (second nonaqueous electrolyte solution) are EC:DMC:EMC=3:4:3 in sample 9. The viscosity of this external electrolyte solution 80*a* (second nonaqueous electrolyte solution) was 18.9 (mPa·s). The volumetric proportions for the solvent in the external, electrolyte solution 80*a* (second nonaqueous electrolyte solution) are EC:DMC:EMC=3:5:2 in sample 10. The viscosity of this external electrolyte solution 80*a* (second nonaqueous electrolyte solution) was 17.8 (mPa·s).

The EMC was reduced and the DMC was increased in sample 9 relative to sample 6 in the volumetric proportions for the solvent in the external electrolyte solution 80*a* (second nonaqueous electrolyte solution). As a result, the viscosity of the external electrolyte solution 80*a* of sample 9 is lower than in sample 6. The percentage increase in resistance (%) for sample 9 was 143.0. The EMC was reduced and the DMC was increased in sample 10 relative to sample 9 in the volumetric proportions for the solvent in the external electrolyte solution 80*a* (second nonaqueous electrolyte solution). As a result, the viscosity of the external electrolyte solution 80*a* of sample 10 is lower than in sample 9. The percentage increase in resistance (%) for sample 10 was 133.1.

Thus, as indicated above, various comparisons were carried out between evaluation cells having the same viscosity for the internal electrolyte solution and the external electrolyte solution 80*a* (i.e., $\alpha=\beta$) and evaluation cells in which the viscosity of the external electrolyte solution 80*a* was lower than that of the internal electrolyte solution (i.e., $\alpha>\beta$). Here, $\alpha$ is the viscosity of the internal electrolyte solution that is present in the interior of the wound electrode assembly 40 and $\beta$ is the viscosity of the external electrolyte solution 80*a* collected at the bottom of the battery case 20. As a result, regardless of the composition and viscosity of the internal electrolyte solution, a trend was obtained whereby an evaluation cell having a lower viscosity for the external electrolyte solution 80*a* than for the internal electrolyte solution, had a smaller percentage increase in resistance (%) after the high-rate cycle test than did an evaluation cell that had the same viscosity for the internal electrolyte solution and the external electrolyte solution 80*a*. In addition, when the viscosity of the external electrolyte solution 80*a* was lower than that of the internal electrolyte solution, a trend was obtained whereby an evaluation cell having a larger reduction in the viscosity of the external electrolyte solution 80*a* from that of the internal electrolyte solution provided a smaller percentage increase in resistance (%) after the high-rate cycle test.

The inventor hypothesizes that the following phenomena occur with regard to the trends obtained in this evaluation testing. In the high-rate cycle test, in which repetitive high-rate charge/discharge is carried out, the wound electrode assembly 40 undergoes swelling and contraction repeatedly, and as a consequence nonaqueous electrolyte solution is output from the interior of the wound electrode assembly 40 to the outside and nonaqueous electrolyte solution returns from outside the wound electrode assembly 40 to its interior. When, at this time, the amount of nonaqueous electrolyte solution output from the interior of the wound electrode assembly 40 to the outside is very much larger than the amount of nonaqueous electrolyte solution that returns from outside the wound electrode assembly 40 to its interior, the interior of the wound electrode assembly 40 will then be deficient in nonaqueous electrolyte solution and the resistance of the evaluation cell will be prone to increase as a result. When, in contrast, the amount of nonaqueous electrolyte solution output from the interior of the wound electrode assembly 40 to the outside is not very much larger than the amount of nonaqueous electrolyte solution that returns from outside the wound electrode assembly 40 to its interior, the nonaqueous electrolyte solution necessary for the battery reactions is then maintained in the interior of the wound electrode assembly 40 and the increase in the resistance of the evaluation cell is kept down as a result.

For an evaluation cell in which the internal electrolyte solution has the same viscosity as the external electrolyte solution 80*a*, as in samples 1 and 6, it is thought that the amount of nonaqueous electrolyte solution output from the interior of the wound electrode assembly 40 to the outside was larger than the amount of nonaqueous electrolyte solution returned to the interior of the wound electrode assembly 40 from the outside and the percentage increase in the resistance (%) after the high-rate cycle test was then large.

In contrast to this, in samples 2 to 5 and samples 7 to 10, in which the viscosity of the external electrolyte solution 80*a* is lower than for the internal electrolyte solution, the viscosity of the internal electrolyte solution is higher than that of the external electrolyte solution 80*a*, and this impedes output of the internal electrolyte solution from the interior of the wound electrode assembly 40 to the outside in the high-rate cycle test. In addition, because the viscosity of the external electrolyte solution 80*a* is lower than that of the internal electrolyte solution, the external electrolyte solution 80*a* readily enters the interior of the wound electrode assembly 40 in the high-rate cycle test.

Thus, in samples 2 to 5 and samples 7 to 10, it is thought that the amount of nonaqueous electrolyte solution output from the interior of the wound electrode assembly 40 to the outside was not much larger than the amount of nonaqueous electrolyte solution returned to the interior of the wound electrode assembly 40 from the outside and the percentage increase in resistance (%) after the high-rate cycle test was kept low as a result. Moreover, in this case, among samples 2 to 5 and samples 7 to 10, in which the viscosity of the external electrolyte solution 80*a* was lower than that of the internal electrolyte solution, it is thought that, for a sample that had a greater reduction in the viscosity of the external electrolyte solution 80*a* from that of the internal electrolyte solution (for example, samples 3, 5, 8, and 10), the amount of nonaqueous electrolyte solution output from the interior of the wound electrode assembly 40 to the outside was less substantially larger than the amount of nonaqueous electrolyte solution returned to the interior of the wound electrode assembly 40 from the outside and the percentage increase in resistance (%) after, the high-rate cycle test was then smaller.

According to the findings of the inventor, for nonaqueous electrolyte secondary batteries having the same structure, these trends are trends that originate with the viscosity of the internal electrolyte solution present in the interior of the wound electrode assembly 40 and the viscosity of the external electrolyte solution 80a collected at the bottom of the battery case 20. As a consequence, they largely do not originate with the composition of the internal electrolyte solution or the composition of the external electrolyte solution 80a. Examples have been provided in which the internal electrolyte solution and the external electrolyte solution 80a have the same salt concentration, but, according to the findings of the inventor, the internal electrolyte solution may have a salt concentration different from that of the external electrolyte solution 80a. For example, the viscosities of the internal electrolyte solution and the external electrolyte solution 80a may be adjusted by varying the salt concentration of the internal electrolyte solution and the external electrolyte solution 80a.

As indicated in the preceding, the herein proposed nonaqueous electrolyte secondary battery is, as shown in FIG. 1, provided with a wound electrode assembly 40, a battery case 20 that houses the wound electrode assembly 40, and a nonaqueous electrolyte solution 80 contained in the battery case 20 (refer to FIG. 3). Within this nonaqueous electrolyte solution 80, $\alpha>\beta$ where $\alpha$ is the viscosity of the internal electrolyte solution present in the interior of the wound electrode assembly 40 and $\beta$ is the viscosity of the external electrolyte solution 80a collected at, the bottom of the battery case 20. This nonaqueous electrolyte secondary battery can maintain its battery characteristics at high levels in applications where high-rate charge/discharge occurs repeatedly.

In this case the viscosity difference $(\alpha-\beta)$ between the viscosity $\alpha$ of the internal electrolyte solution and the viscosity $\beta$ of the external electrolyte solution is, for example, preferably greater than 0.1 mPa·s. This supports an even more reliable and secure maintenance of the battery characteristics at high levels in repetitive high-rate charge/discharge applications.

Moreover, in order in this case to realize a viscosity difference $(\alpha-\beta)>0$ between the viscosity $\alpha$ of the internal electrolyte solution and the viscosity $\beta$ of the external electrolyte solution 80a, for example, the composition of the solvent in the nonaqueous electrolyte solution may be different between the internal electrolyte solution and the external electrolyte solution 80a. In specific terms, when DMC is present in the solvent composition for both the internal electrolyte solution and the external electrolyte solution 80a, the volumetric proportion of the DMC in the solvent for the external electrolyte solution 80a is preferably higher than that for the internal electrolyte solution. The solvents for the internal electrolyte solution and the external electrolyte solution 80a preferably are both mixtures of EC, DMC, and EMC.

The method of producing the nonaqueous electrolyte secondary battery preferably includes a step of preparing the wound electrode assembly 40; a step of housing the wound electrode assembly 40 in the battery case 20; and a step of introducing the nonaqueous electrolyte solution 80 (refer to FIG. 3) into the battery case 20. In this case, the step of introducing the nonaqueous electrolyte solution preferably includes a step of establishing a vacuum in the battery case 20 and filling with the first nonaqueous electrolyte solution in an amount corresponding to the open space in the wound electrode assembly 40; and a step of introducing into the battery case 20, after the introduction of the first nonaqueous electrolyte solution, the second nonaqueous electrolyte solution having a lower viscosity than that of the first nonaqueous electrolyte solution. In this case, the viscosity $\alpha$ of the internal electrolyte solution is adjusted using the first nonaqueous electrolyte solution and the viscosity $\beta$ of the external electrolyte solution 80a is adjusted using the second nonaqueous electrolyte solution. By doing this, $\alpha>\beta$ can be realized for the viscosity $\alpha$ of the internal electrolyte solution and the viscosity $\beta$ of the external electrolyte solution 80a as described above.

The herein proposed nonaqueous electrolyte secondary battery and its production method are described in the preceding, but the invention is not limited to the hereinabove-described embodiments.

For example, an EC plus DMC plus EMC mixture has been provided as an example of the composition of the solvent in the nonaqueous electrolyte solutions provided as examples in the test examples, but the composition of the solvent in the nonaqueous electrolyte solutions is not limited to this since the issue is the viscosities of the nonaqueous electrolyte solutions. In addition, the volumetric proportions for the solvents in the nonaqueous electrolyte solutions are also not limited to the hereinabove-described embodiments.

Figure 6:
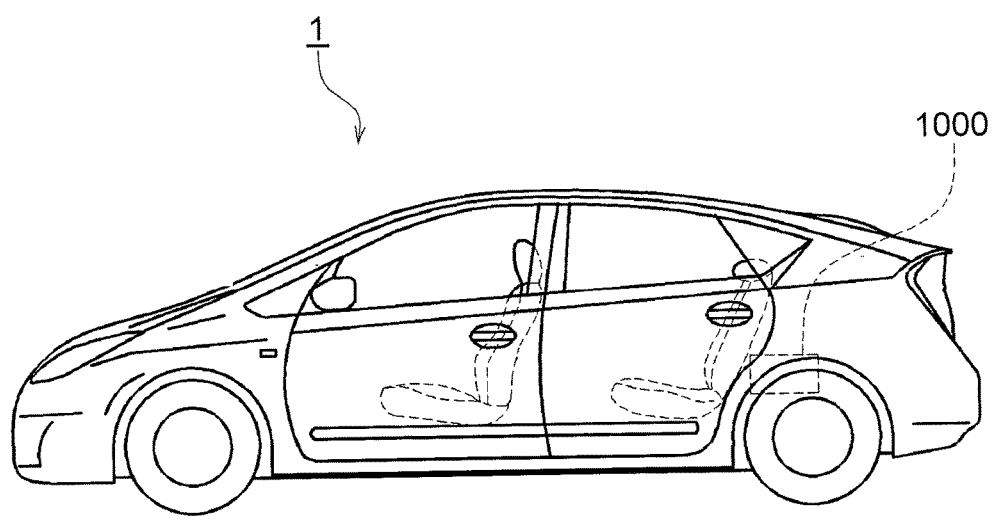
FIG. 6 is a diagram that shows a vehicle in which a secondary battery (battery pack) has been installed.

The herein disclosed nonaqueous electrolyte secondary battery can in particular maintain its battery characteristics at high levels in applications where repetitive high-rate charge/discharge occurs. A lithium ion secondary battery having stable properties can therefore be provided. Accordingly, it is particularly favorable, for example, for use, as shown in FIG. 6, as a vehicle drive battery 1000, for which stable properties are a requirement. This vehicle drive battery 1000 can have a battery pack configuration formed by the serial connection of a plurality of nonaqueous electrolyte secondary batteries. The vehicle 1 provided with this vehicle drive battery 1000 typically encompasses automobiles and particularly hybrid automobiles (including plug-in hybrid vehicles) and electric motor-equipped automobiles such as electric automobiles.

Lithium ion secondary batteries and battery packs having lithium ion secondary batteries as the individual batteries have been provided herein as examples. The construction related to the herein proposed lithium ion secondary battery may also be applied to other nonaqueous electrolyte secondary batteries having the same internal structure. In addition, the construction related to the herein proposed battery pack may, insofar as the structure with reference to the individual batteries is the same, also similarly be applied to battery packs in which the individual batteries are a nonaqueous electrolyte secondary battery. Examples of these other nonaqueous electrolyte secondary batteries referenced here are sodium ion secondary batteries and polymer lithium ion secondary batteries.

While specific examples of the invention have been described in detail in the preceding, these are nothing more than examples and do not limit the claims. The art described in the claims encompasses diverse modifications and alterations of the specific examples provided above as examples.

The invention claimed is:

1. A nonaqueous electrolyte secondary battery comprising:
   a wound electrode assembly;
   a battery case housing the wound electrode assembly; and
   a nonaqueous electrolyte solution housed in the battery case, the nonaqueous electrolyte solution including an internal electrolyte solution and an external electrolyte solution, the internal electrolyte solution contained in the wound electrode assembly, the external electrolyte solution collected at a bottom of the battery case, and viscosity of the internal electrolyte solution being greater than viscosity of the external electrolyte solution,
   wherein a difference obtained by subtracting the viscosity of the external electrolyte solution from the viscosity of the internal electrolyte solution is greater than 0.1 mPa·s.

2. The nonaqueous electrolyte secondary battery according to claim 1, wherein a composition of a solvent in the internal electrolyte solution is different from a composition of a solvent in the external electrolyte solution.

3. The nonaqueous electrolyte secondary battery according to claim 1, wherein
   the internal electrolyte solution contains dimethyl carbonate as a composition of a solvent of the internal electrolyte solution,
   the external electrolyte solution contains dimethyl carbonate as a composition of a solvent of the external electrolyte solution, and
   a volumetric proportion of the dimethyl carbonate in the solvent in the external electrolyte solution is higher than a volumetric proportion of the dimethyl carbonate in the solvent in the internal electrolyte solution.

4. The nonaqueous electrolyte secondary battery according to claim 3, wherein the solvent in the internal electrolyte solution and the solvent in the external electrolyte solution are both a mixture of ethylene carbonate, dimethyl carbonate, and ethyl methyl carbonate.

5. The nonaqueous electrolyte secondary battery according to claim 1, wherein the external electrolyte solution is collected at the bottom of the battery case outside the wound electrode assembly.

6. A method for producing the nonaqueous electrolyte secondary battery according to claim 1, the battery including the battery case, the wound electrode assembly, the internal nonaqueous electrolyte solution, and the external nonaqueous electrolyte solution,
   the method comprising:
      preparing the wound electrode assembly;
      housing the wound electrode assembly in the battery case;
      establishing a vacuum in the battery case and introducing into the battery case the internal nonaqueous electrolyte solution in an amount corresponding to an open space in the wound electrode assembly; and
      introducing into the battery case, after the introduction of the internal nonaqueous electrolyte solution, the external nonaqueous electrolyte solution having a lower viscosity than that of the internal nonaqueous electrolyte solution,
   wherein a difference obtained by subtracting the viscosity of the second electrolyte solution from the viscosity of first internal electrolyte solution is greater than 0.1 mPa·s.

* * * * *